United States Patent [19]
Ohmuro

[11] Patent Number: 5,134,468
[45] Date of Patent: Jul. 28, 1992

[54] OPTICAL APPARATUS FOR VARYING THE LENGTHS OF OPTICAL PATH OF COLOR COMPONENT LIGHT BEAMS

[75] Inventor: Ryuji Ohmuro, Kanagawa, Japan

[73] Assignee: Canon Kabushiki Kaisha, Tokyo, Japan

[21] Appl. No.: 479,605

[22] Filed: Feb. 13, 1990

[30] Foreign Application Priority Data

Feb. 21, 1989 [JP] Japan .................................. 1-042778
May 23, 1989 [JP] Japan .................................. 1-130683

[51] Int. Cl.$^5$ ...................... H04N 9/09; H04N 9/097; H04N 9/04; H04N 9/07
[52] U.S. Cl. ........................................ 358/50; 358/55; 359/665; 359/637
[58] Field of Search ...................... 358/50, 51, 55, 225, 358/41; 359/639, 640, 665, 666, 676, 737, 629, 637, 638, 196, 224, 634

[56] References Cited

U.S. PATENT DOCUMENTS

| 4,164,752 | 8/1979 | Doi et al. ................. 358/55 |
| 4,507,679 | 3/1985 | Bendell ..................... 358/55 |
| 4,600,275 | 7/1986 | Iizuka ....................... 350/419 |
| 4,676,614 | 6/1987 | Ohno ........................ 350/419 |
| 4,789,891 | 11/1988 | Kanayama ............. 358/55 |
| 4,840,473 | 6/1989 | Kushibiki et al. ..... 350/419 |
| 4,916,529 | 4/1990 | Yamamoto et al. ... 358/50 |

FOREIGN PATENT DOCUMENTS

| 0298795 | 1/1989 | European Pat. Off. . |
| 0342753 | 11/1989 | European Pat. Off. . |
| 2744592 | 4/1978 | Fed. Rep. of Germany ........ 358/55 |
| 0090986 | 4/1988 | Japan . |
| 0132590 | 6/1988 | Japan . |

Primary Examiner—James J. Groody
Assistant Examiner—Safet Metjahic
Attorney, Agent, or Firm—Fitzpatrick, Cella, Harper & Scinto

[57] ABSTRACT

An optical apparatus comprising an objective lens for producing a light bundle, a color separation prism receptive of the light bundle for producing two or more component light beams, two or more solid-state image sensors arranged behind the respective spaces between the exit faces of the prism in fixedly secured relation, and optical means arranged in all but one of the spaces between the exit faces of the prism and the image sensors to vary the lengths of the optical paths.

17 Claims, 4 Drawing Sheets

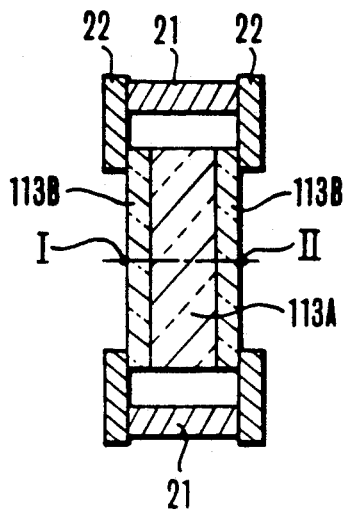
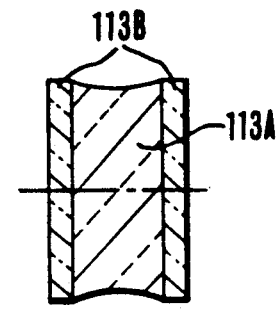
FIG.5(A)　　　FIG.5(B)　　FIG.5(C)
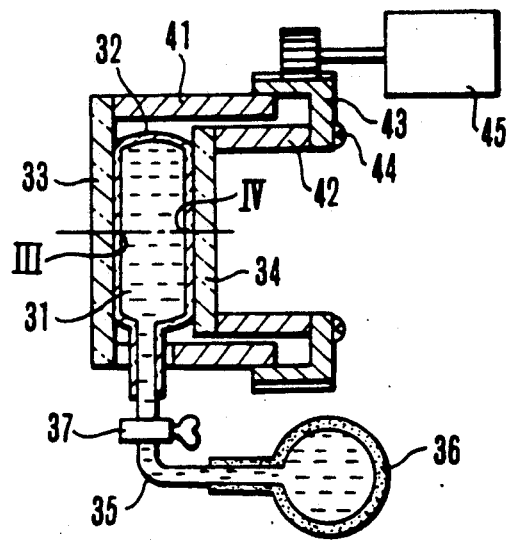
FIG.6

OPTICAL APPARATUS FOR VARYING THE LENGTHS OF OPTICAL PATH OF COLOR COMPONENT LIGHT BEAMS

BACKGROUND OF THE INVENTION

1. Field of the Invention

This invention relates to optical systems for television cameras and, more particularly, to the tracking adjustment of a television camera using a solid-state image sensor.

2. Description of the Related Art

In a television camera, light from the objective lens enters the color separation prism to produce three beams of red, green and blue colors with which images are formed on the respective image sensors, and color signals are obtained.

A tracking discrepancy arises from the difference in length between two of the optical paths of the light beams passing through the color separation prism from the objective lens depending on manufacturing errors. Also, because the objective lenses have generally different residual longitudinal chromatic aberrations, the tracking is further degraded if as the lens type is interchanged with another one.

In the past, a television camera employed the tube type image sensor in combination with a mechanism for tracking adjustment included in each of the mechanisms for keeping hold of the image pickup tubes. And, it was usual that its range of adjustment was wide enough to absorb the possible maximum error of tracking.

In recent years, however, as the image sensing device, increasing numbers of the solid-state image sensors have been used in place of the image pickup tube. Since that solid-state image sensor, as compared with the image pickup tube, is very small in size and very light in weight, no such large scale holding mechanism (as in the case of the image pickup tube) is required to be adopt. It is, therefore, easy to simplify the mounting mechanism.

But, because, as has been described before, there is an error in the length of the optical path along which either one of the split light beams produced by the color separation prism travels, a difference results between any two of the lengths of the optical paths, by which a tracking discrepancy arises. Particularly with this origin of discrepancy, if at least two of the solid-state image sensors are fixedly mounted directly on the respective exit faces of the prism, it is difficult to bring all the tracking into coincidence.

For this reason, in the present state of the art of television cameras of the type using the solid-state image sensors, a simple holding mechanism is used to provide a gap between the solid-state image sensor and the exit face of the prim for the purpose of adjusting the tracking. After the tracking adjustment has been performed, the gap is then filled with an adhesive agent, a spacer, or molten metal, thus fixedly securing the solid-state image sensor to the exit face of the prism. In such a way, the tracking error caused by the prism system is absorbed.

In this case, however, the arrangement is such that the image sensor is fixedly mounted at the predetermined start position by using a tool lens, or the like. All that can be done is, therefore, only to absorb the error of the prism system. The before-described problem that the tracking discrepancy due to the differences of the longitudinal chromatic aberration with different lens types cannot be absorbed has been left unsolved.

Also, as the photographic lens, zoom lenses are generally used. By zooming and focusing and by varying of the aperture value, the longitudinal chromatic aberration is also varied. Because of this, in each channel, the image surface is taken out of coincidence with the image sensing plane. This appears to be a tracking error, thus deteriorating the image quality. Particularly with the solid-state image sensor which has lately been put to practical use at a rapidly increasing rate, when applied to the color television camera, it is common that such a solid-state image sensor in the form of a CCD is fixedly mounted on the color separation prism. Therefore, the static correction of longitudinal chromatic aberration which was possible to some extent in the conventional image pickup tube type camera becomes impossible. Hence, it becomes more difficult to stabilize the longitudinal chromatic aberration of the zoom lens.

To achieve this stability of longitudinal chromatic aberration, it may be considered that, for example, a glass material of large extraordinary partial dispersion, though expensive, is employed, or the number of lens elements is increased. But, either the price or the size will increase greatly.

By the way, a method of correcting the tracking by moving the image pickup tube itself to vary its relative position to the color separation prism is proposed in Japanese Patent Publication No. Sho 56-1832. But, in the case of moving the image pickup tube itself, the ratio of the amount of movement of the image pickup tube to the amount of tracking correction becomes 1:1, in other words, the responsiveness is very high. Therefore, highly accurate of correction is difficult to perform. Also, the image pickup tube must be moved in accurate axial alignment with the light beam emerging from the color separation prism. Otherwise, a position discrepancy will arise between two of the channel images, or a so-called registration error is produced. Hence, a deterioration of the image quality results.

SUMMARY OF THE INVENTION

An object of the present invention is to enable an apparatus having a number of image sensor devices, each fixedly secured to a common color separation prism, to carry out tracking adjustment.

Another object of the present invention is to make it possible that, even when the objective lens is interchanged with another one of different residual longitudinal chromatic aberration, a similar image quality to the preceding one is obtained.

Yet another object of the present invention is to maintain the image quality even against change of the photographing conditions of the objective lens.

BRIEF DESCRIPTION OF THE DRAWINGS

FIGS. 5(A), 5(B) and 5(C) illustrate the construction of the main parts of the apparatus of FIG. 4.

FIG. 6 is a sectional view of the construction of the main parts of a fourth embodiment of the invention.

DETAILED DESCRIPTION OF THE PREFERRED EMBODIMENTS

Figure 1:
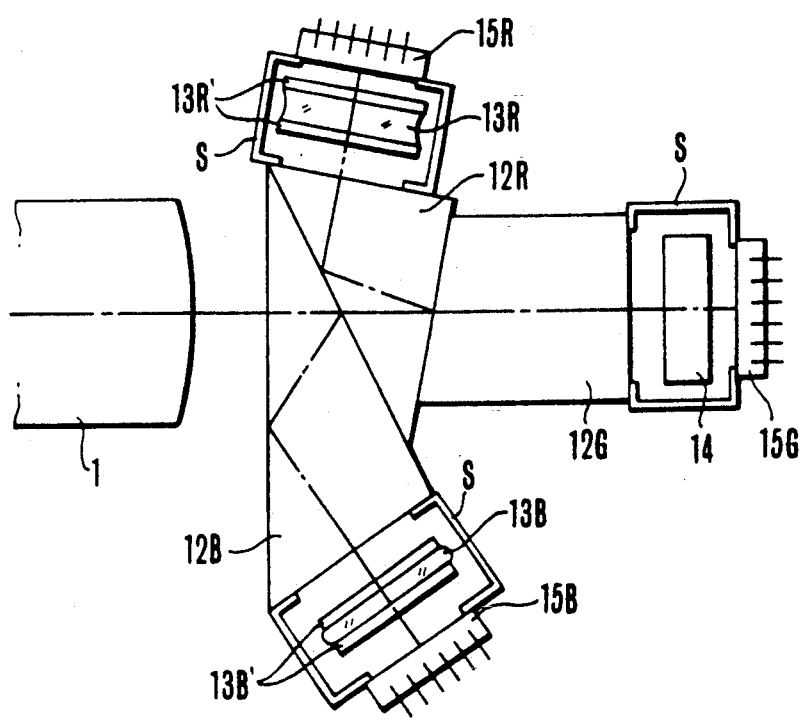
FIG. 1 is a sectional view of a first embodiment of an optical apparatus according to the invention.

FIG. 1 shows an embodiment of the invention, where reference numeral 1 denotes an objective lens. Prism elements 12R, 12G and 12B constitute a 3-color separation prism receptive of the light bundle emerging from the objective lens 1 for producing three light beams of three colors red, green and blue. Three solid-state image sensors 15R, 15G and 15B receptive of respective color component images for producing image signals are fixedly secured to respective holding members S. In turn, the legs of each of the holding members S is assumed to be fixedly secured to the exit face of the respective one of the prism elements 12R, 12G and 12B (as, for example, in Japanese Utility Model Application No. Sho 61-174816). The construction of an air-reduction correcting member (hereinafter abbreviated to the "correcting member") comprised of elements 13R and 13R' and another correcting member comprised of elements 13B and 13B' is described in detail by using FIGS. 2(A), 2(B) and 2(C). Again, a transparent parallel flat plate 14 has an equal air-reduced length to that of the correcting member in the equilibrium state, that is, without applying any compression or tension thereto. The transparent parallel flat plate 14 is positioned in between the exit face of the prism element for the green light beam and the image sensor 15G and is supported on a support member (not shown). The correcting member (13R, 13R') is likewise supported in the path of the red light beam, and the other correcting member (13B, 13B') in the path of the blue light beam. It is to be noted that, instead of using the transparent parallel flat plate 14, the axial position of the image sensor 15G may be changed to an optically equivalent one to that when it is in use.

Using FIGS. 2(A), 2(B) and 2(C), the correcting member will be described in more detail.

Figures 2A, 2B, 2C:
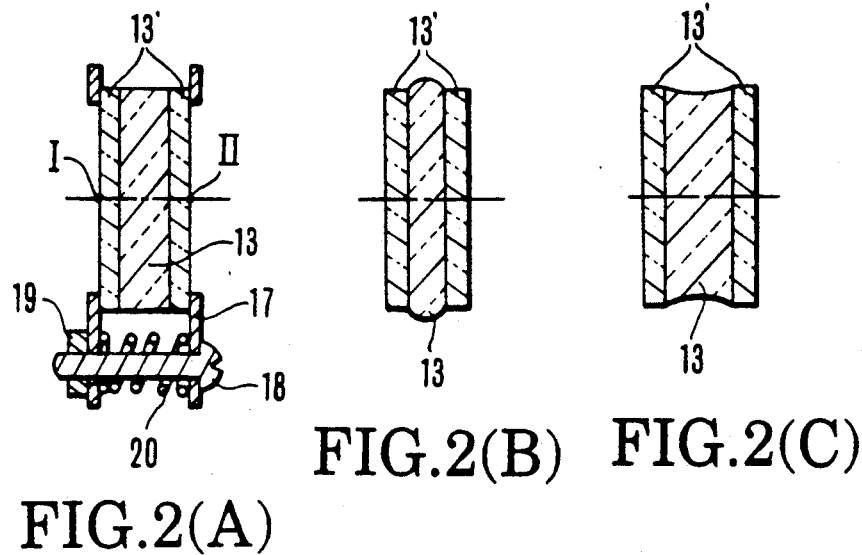
FIGS. 2(A), 2(B) and 2(C) are sectional views illustrating the construction of the main parts of the apparatus of FIG. 1.

FIGS. 2(A), 2(B) and 2(C) show cross sections of two transparent parallel flat plate elements 13' of equal thickness arranged parallel in spaced relation and a transparent elastic body 13 (made of, for example, transparent silicone rubber) adhered in between the plate elements 13'. FIG. 2(A) is a view of the equilibrium state with no external force applied, FIG. 2(B) with a compressing force applied, and FIG. 2(C) with a tension applied. Here, letting the refractive index and thickness of the elastic body 13 be denoted by na and Da respectively and the refractive index and the sum of the thicknesses of the two parallel flat plates 13' by nb and Db respectively, the air-reduced length l air between two points I and II defined in FIG. 2(A) is given by the following expression:

$$l\ air = (Da/na) + (Db/nb)$$

On the assumption that there is no change of the refractive index and the thickness Db of the parallel flat plate 13', the air-reduced length varies depending on the amount of variation "$\Delta Da$", of the thickness Da of the elastic body 13. Its varied mount, denoted by $\Delta l$ air, is determined by the following equation:

$$\Delta l\ air + (\Delta Da/na)$$

Also, if the image sensor is fixedly mounted on the exit face of the prism, the air separation between the objective lens and the image sensor is decreased by an amount equal to the varied amount $\Delta Da$ of the thickness of the elastic body 13.

Therefore, by making the thickness of the elastic body 13 vary $\pm \Delta Da$, the air-reduced length between the objective lens and the image sensor can be corrected within a range of $\pm \Delta Da \cdot (na-1)/(na)$. FIG. 2(B) shows an operative position when correcting the air-reduced length to the plus region, while FIG. 2(C) shows another operative position when correcting to the minus region.

One method of applying a compressing force or an expanding force to the correcting member is, for example, as shown in FIG. 2(A), to use a mechanism comprising a pair of apertured support plates 17 adhered to the respective parallel flat plate elements 13' and three sets of screws 18, nuts 19 and intermediate coil springs 20 (only one of which is shown) arranged on a common circle near the circumference of the correcting member in equally spaced relation so that the amount of rotation of the screw 18 is adjusted to effect the desired result.

The tracking discrepancy between the red and blue channel images due to the difference in the amount of longitudinal chromatic aberration can be corrected in such a way that, as shown in FIG. 1, the correcting member (13R, 13R') in the path of the red light beam is expanded, while simultaneously compressing the correcting member (13B, 13B') in the path of the blue light beam.

Figure 3:
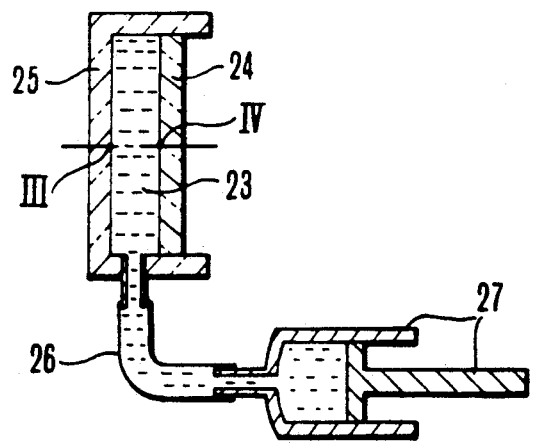
FIG. 3 is a sectional view of the construction of the main parts of a second embodiment of the invention.

FIG. 3 shows another embodiment of the correcting member.

A transparent cylindrical cup 25 is assembled with a movably fitted plate 24 made of a transparent parallel flat plate to form a space therebetween which is filled with a transparent liquid (or gel-like substance) 23. The cylindrical cup 25 has a hole penetrated through the side wall to permit the liquid 23 to come and go. This hole is connected through a bent pipe 26 to a piston 27. The interiors of the pipe 26 and the piston 27 are also filled with the liquid 23. When the piston 27 moves, the liquid 23 transmits pressure to displace the movable plate 24, thus appearing as a change of the thickness III–IV of the liquid 23. If the diameter of the cylindrical cup 25 is sufficiently large in relation to the effective light beam, the same effect as that of the member constructed from the elastic body 13 and the two parallel flat plates 13' can be produced.

On the other hand, though the embodiment of FIG. 1 has been described in connection with the use of the 3-color separation prism in the television camera, the invention can be applied also to the 2-color separation prism type of television camera. Also, though the correcting member has been made to operate in either of the compression and tension modes, it may otherwise be used in either of the equilibrium state and the compression mode.

It should be noted that in the embodiments, the two parallel flat plates have been described as being equal in thickness to each other, the thicknesses of the two parallel flat plates may differ from each other. Also, if the refractive index of the elastic body, the liquid or the gel-like substance is equal to that of the two parallel flat plates, the shape of the surfaces of the two plates which come into contact with the elastic body, liquid or gel-like substance is not necessarily plain.

Figure 4:
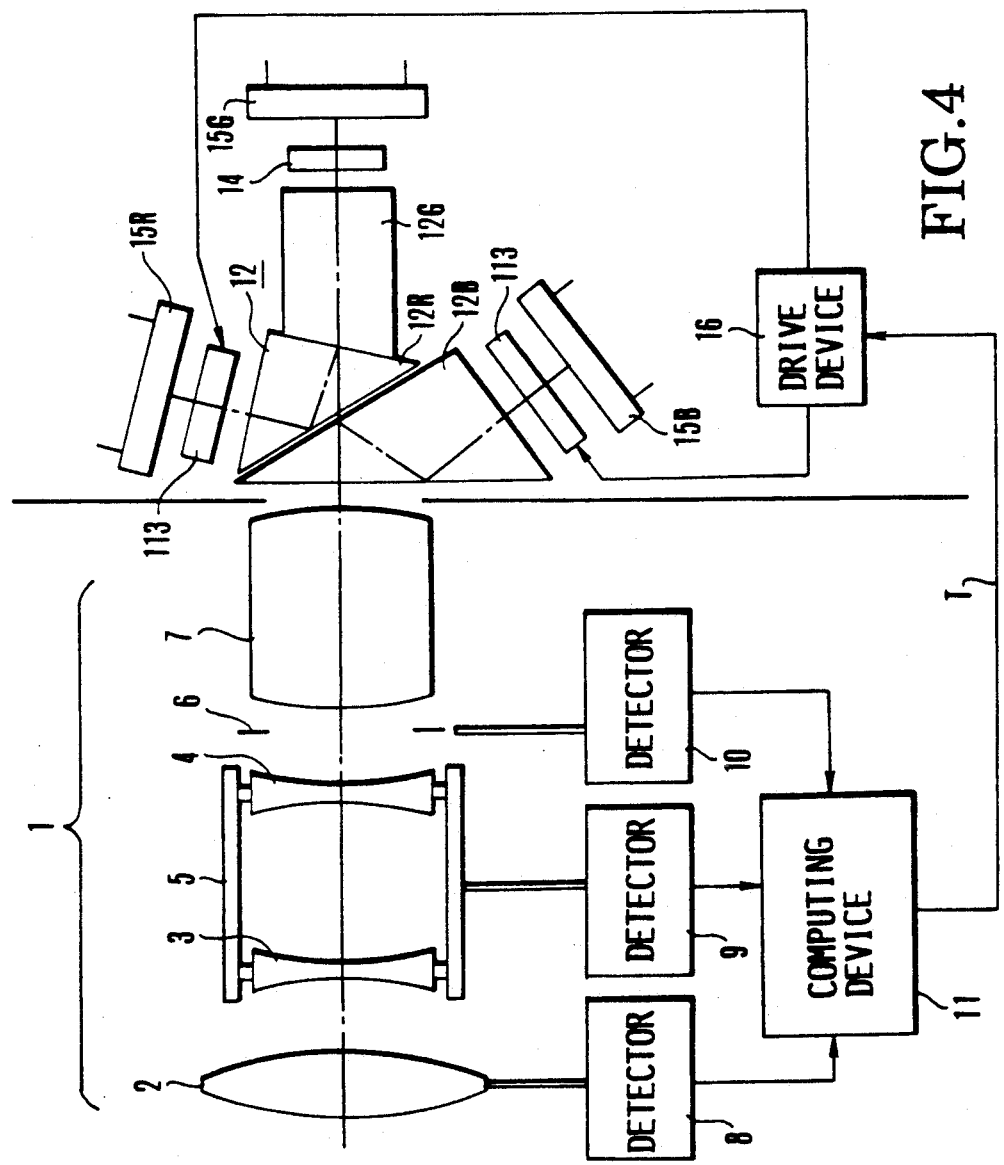
FIG. 4 is a sectional view of a third embodiment of the optical apparatus according to the invention.

FIG. 4 shows the construction of the third embodiment.

In FIG. 4, a photographic lens 1 for forming images of an object on the solid-state image sensors is attachable to, and detachable from, the camera body. A first lens group 2 movable for focusing, a zoom section comprising a variator 3 and a compensator 4 move along cam grooves cut in a rotary sleeve 5 to vary the image magnification, a diaphragm 6 and a relay lens 7 constitute the lens 1. Each of the lens groups is schematically depicted. A color separation prism 12 is comprised of prism elements 12B, 12G and 12R arranged to split the image forming light bundle from the photographic lens 1 into three light beams of blue, green and red colors respectively. Reference numeral 113 denotes correcting members, in the present embodiment, positioned in the blue and red channels respectively.

The solid-state image sensors 15R, 15G and 15B are fixedly carried on respective holding members (not shown) and oriented to the respective exit faces of the color separation prism 12. The legs of the holding members are assumed to be fixedly secured to the exit faces of the prism elements 12R, 12G and 12B.

The construction of the correcting member 113 will be described later in detail by using FIGS. 5(A), 5(B) and 5(C). A transparent parallel flat plate 14 has an equal air-reduced length to that of the correcting member 113 in the equilibrium state, in other words, without no compressing force or expanding force applied to the correcting member 113. The transparent parallel flat plate 14 is positioned in between the exit face for the green light beam of the prism and the image sensor 15G and is carried on a support member (not shown). Likewise the two correcting members 113 in the paths of the red and blue light beams respectively are carried on support members.

The axial positions of the focusing or first lens group 2 and the zoom section 3, 4 and the aperture value of the diaphragm 6 are detected by respective detectors 8, 9 and 10 in the form of encoders, potentiometers or like detectors. The outputs of the detectors 8, 9 and 10 are sent to a computing device 11. From the three items of information, namely, the object distance, the focal length of the entire system and the size of diaphragm aperture, the computing device 11 derives the amount of longitudinal chromatic aberration intrinsic to the used photographic lens, and produces a correction signal for the red and blue channels. This correction signal is sent through a signal line T to a drive device 16 for the correcting members 113. Responsive to the correction signal from the computing device 11, the drive device 16 moves the correcting members 113 for the red and blue channels to vary the tracking by amounts that cause the longitudinal chromatic aberration to be compensated for. Thus, the tracking errors are removed to maintain the combined image at an excellent quality.

Next, on the basis of FIGS. 5(A), 5(B) and (C), the construction and the operation of the correcting member will be described.

The correcting member is constructed with two transparent parallel flat plates 113B of equal thickness and a transparent elastic layer 113A (made of, for example, transparent silicone rubber) positioned between, and adhered to, the plates 113B.

A piezoelectric element 21 of laminated form for converting electrical energy to dynamic energy expands or contracts to a degree depending on the voltage applied by the correcting member drive device 16. A pair of ring-shaped retainer plates 22 is connected to each other through the piezoelectric element 21 by an adhesive agent and functions to translate the expanding or contracting force of the piezoelectric element 21 to the compressing force or expanding force for the correcting member 113. FIG. 5(A) shows the equilibrium state with no external force applied, FIG. 5(B) with the compressing force applied, and FIG. 5(C) with the expanding force applied.

As has already been described by using FIGS. 2(A), 2(B) and 2(C), by varying the thickness of the elastic layer 113A in a range of $\pm \Delta Da$, the air-reduced length of the optical path between the photographic lens and the image sensor can be made to vary in a range of $\pm \Delta Da \cdot (na-1)/na$. FIG. 5(B) shows an operative position where the air-reduced length is varied to the plus region, and FIG. 5(C) shows variation to the minus region. By controlling the variation of the air-reduced length in such a manner, the tracking error due to the longitudinal chromatic aberration can be corrected. It should be noted that, if the refractive index na of the elastic layer 113A is taken at $na=1.5$, the ratio of the varied amount of the thickness Da to the corrected amount reacher 3:1. This means that the correction can be made with a higher accuracy.

It should further be noted that, if the correcting member for each channel is arranged so that the normal of the entrance surface of the front parallel flat plate 113B and the normal of the exit surface of the rear parallel flat plate 113B each are almost parallel to the optical axis of the corresponding channel, the direction in which the parallel flat plates 113 move does not necessarily coincide with the optical axis of the light beam for the corresponding channel emerging from the color separation prism. Even if out of coincidence, the registration error produced is so little as it does not become a problem in actual practice.

FIG. 6 shows the fourth embodiment of the correcting member. A transparent liquid or gel-like substance 31 fills a balloon-shaped bag 32 made of transparent elastic material (for example, silicone rubber). The bag 32 communicates with another baloon-shaped liquid reservoir 36 through a bent conduit 35 having a purge valve 37 at an intermediate point of the length, so that the liquid 31 comes and goes between the bag 32 and the reservoir 36 past the bent conduit 35. The reservoir 36 is made stronger in shrinking force than the bag 32 s that the bag 32 tends always to expand. The bag 32 is sandwiched between a fixed plate 33 and a movable plate 34 each in the form of a transparent parallel flat plate and is adhered to the fixed plate 33 and the movable plate 34 in a sufficiently larger area than the size of the effective light beam. The fixed plate 33 is fixedly mounted on one end of a fixed tubule 41, while the movable plate 34 is fixedly mounted on one end of a movable tubular carrier 42. The other end of the tubular carrier 42 is unified by screw fasteners 44 to a flanged ring 43 having a gear formed in the outer peripheral surface thereof. The ring 43 is movably fitted on the outer diameter of the fixed tube 41. A pulse motor 45 is operatively connected to the gear of the ring 43 and by an angle depending on the number of pulses representing the amount of tracking correction provided from the correcting member drive device 16. Such rotation is transmitted to movement of the movable plate 34 and the movable tube 42 in horizontal directions on the paper as viewed in FIG. 6. As the movable plate 34 moves, a variation of the thickness between points III–IV of the liquid 31 appears. Hence, it is possible to produce the same effect as that of the member constructed with the elastic layer 113A and the two parallel flat plates 113B of FIGS. 5(A), (B) and 5(C).

Though, in the embodiment of FIG. 6, the pulse motor 45 has been used, another type of motor may be used.

Also, the signal to be inputted to the drive device 16 is not required to be supplied from the photographic lens system. It may otherwise be obtained from a device a person is operating while observing external information on, for example, a wave form monitor.

As has been described above, according to the invention, in the illustrated embodiments thereof, after the light bundle has been split into two or more light beams, between the exit face of the prism and the image sensor in each set, a parallel flat plate is positioned, and at least one of the parallel flat plates is constructed in such a form that the space between two transparent parallel flat plate elements is filled with a transparent elastic body, or a liquid or gel-like substance and arranged to vary its thickness on the basis of information from the photographic lens system or an external output device, thereby it being made possible to obtain a tracking position which is always good for any working condition of the lens. This produces an advantage that the presence of longitudinal chromatic aberration in the photographic lens is prevented from deteriorating the performance so that the quality of the television image can be maintained excellently.

Again, according to the invention, the tracking position of each channel can be corrected independently of the others. For the aberration correction of the objective lens, therefore, the same level of correction standard as the prior art suffices. This gives another advantage that the necessity of using expensive glass in the photographic lens, or increasing the number of lens elements to save the loss of the imaging performance is also obviated, thus making it possible to realize a television camera of high performance at a low cost.

What is claimed is:

1. An optical apparatus comprising:
   an optical assembly having an entrance face and a plurality of exit faces, for receiving a light bundle from an objective lens through said entrance face, and for splitting the light bundle into a plurality of individual component light beams and emitting said individual component beams from said exit faces respectively;
   a plurality of image sensing devices for respectively receiving the individual component light beams from said exit faces and forming electrical signals therefrom, each sensing device being disposed to cause a distance from a respective exit face of said optical assembly to an image receiving surface of a respective sensing device to be kept constant; and
   a plurality of optical means respectively arranged in spaces between said exit faces of said optical assembly and said respective image sensing devices for changing the lengths of the optical paths between the respective exit faces and image receiving surfaces, at least one of said optical means comprising two movable parallel plates with a flexible material disposed therebetween on an optical axis of said one optical means for variably changing the length of its respective optical path, another of said optical means comprising a plate having a predetermined thickness.

2. An optical apparatus according to claim 1, wherein said one optical means includes an optically transparent substance sandwiched between said two parallel plates, and an actuator for varying the distance between said two parallel plates.

3. An apparatus according to claim 2, wherein said transparent substance comprises an elastic body.

4. An apparatus according to claim 2, wherein said transparent substance comprises a liquid.

5. An apparatus according to claim 2, wherein said transparent substance comprises a gel-like substance.

6. An apparatus according to claim 2, wherein said actuator comprises a manually adjusted actuator.

7. An apparatus according to claim 2, wherein said actuator comprises a manually adjusted actuator.

8. A photographic apparatus comprising:
   an objective lens;
   an optical assembly having an entrance face and a plurality of exit faces, for receiving a light bundle from said objective lens through said entrance face, and for splitting the light bundle into a plurality of individual component light beams and emitting said individual component light beams from said exit faces respectively;
   a plurality of image sensing devices for respectively receiving the individual component light beams from said exit faces and for producing electrical signals therefrom, each sensing device being disposed to cause a distance from a respective exit face of said optical assembly to an image sensing surface of a respective sensing device to not vary; and
   optical means arranged in at least one space between one exit face of said optical assembly and the respective image sensing device to vary the length of the optical path between said one exit face and the respective image sensing device according to a signal provided from said objective lens, said optical means including at least one optical element having (a) two movable parallel plates disposed orthogonal to an optical axis of said one exit face, and (b) a flexible, optically transparent substance disposed between said plates and on said optical axis, said two plates being movable to vary the length of said optical path.

9. A photographic apparatus according to claim 8, wherein said transparent substance comprises an elastic body.

10. A photographic apparatus according to claim 8, wherein said transparent substance comprises a liquid.

11. A photographic apparatus according to claim 8, wherein said transparent substance comprises a gel-like substance.

12. A photographic apparatus according to claim 8, wherein the signal provided from said objective lens corresponds to a photographic condition of said objective lens.

13. A photographic apparatus according to claim 12, wherein said photographic condition comprises a zooming value.

14. A photographic apparatus according to claim 12, wherein said photographic condition comprises a degree of focus.

15. A photographic apparatus according to claim 12, wherein said photographic condition comprises an aperture value.

16. A photographic apparatus according to claim 8, wherein said optical assembly has a plurality of prisms.

17. A photographic apparatus according to claim 8 wherein said optical means includes first and second optical elements, and wherein said first optical element is disposed in an optical path of a red component light beam, and wherein said second optical element is disposed in an optical path of a blue component light beam.

* * * * *

UNITED STATES PATENT AND TRADEMARK OFFICE
CERTIFICATE OF CORRECTION

PATENT NO. : 5,134,468          Page 1 of 2
DATED       : July 28, 1992
INVENTOR(S) : Ryuji Ohmuro It is certified that error appears in the above-identified patent and that said Letters Patent is hereby corrected as shown below:

COLUMN 1

Line 25, "as" should be deleted.
    Line 40, "adopt." should read --adopted.--.
    Line 56, "prim" should read --prism--.

COLUMN 2

Line 35, "of" should be deleted.

COLUMN 3

Line 15, "is" should read --are--.

COLUMN 6

Line 45, "s that" should read --so that--.

COLUMN 7

Line 1, "(B)" should read --5(B)--.

UNITED STATES PATENT AND TRADEMARK OFFICE
CERTIFICATE OF CORRECTION

PATENT NO. : 5,134,468
DATED : July 28, 1992
INVENTOR(S) : Ryuji Ohmuro

It is certified that error appears in the above-identified patent and that said Letters Patent is hereby corrected as shown below:

<u>COLUMN 8</u>

Line 61, "has" should read --comprises--.
    Line 62, "claim 8" should read --claim 8,--.

Signed and Sealed this

Twenty-first Day of September, 1993

Attest:

BRUCE LEHMAN

Attesting Officer    Commissioner of Patents and Trademarks